Patented June 10, 1930

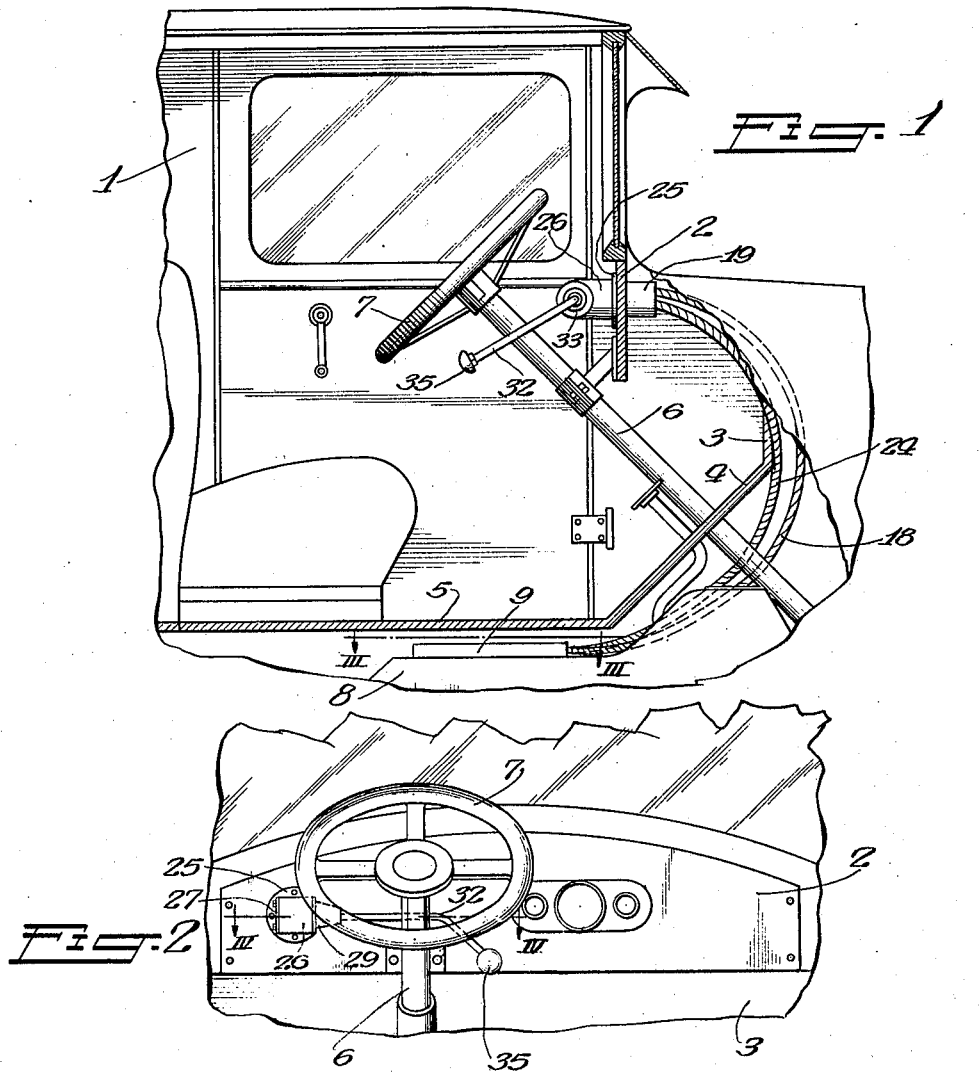

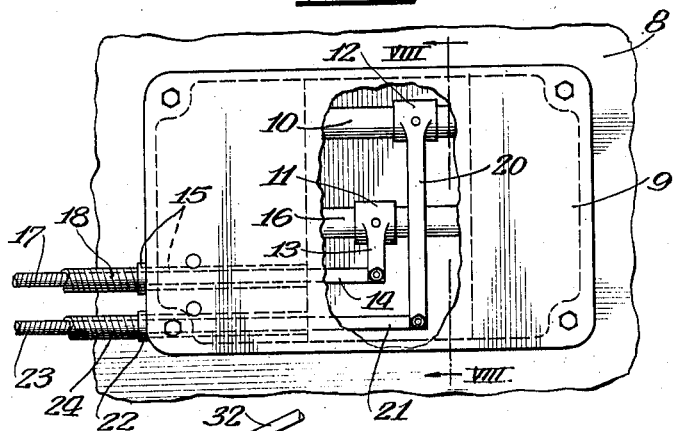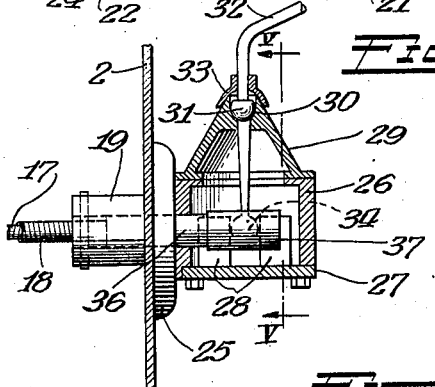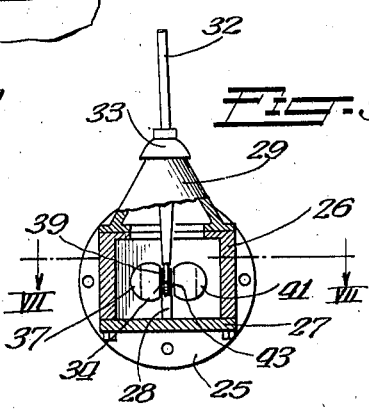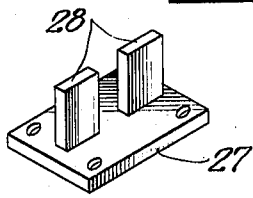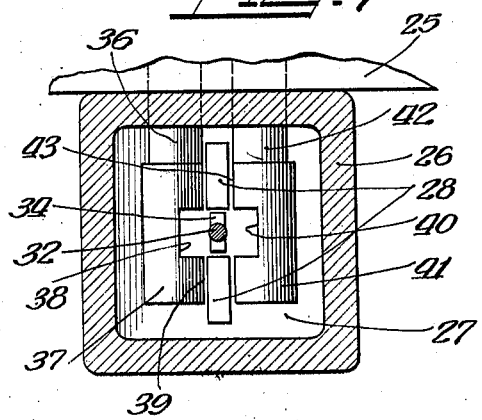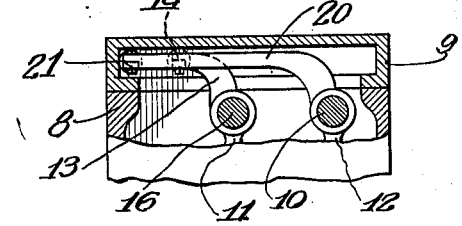

1,762,172

UNITED STATES PATENT OFFICE

BERT GYLLIN, OF CHICAGO, ILLINOIS

GEAR-SHIFT CONTROL

Application filed March 28, 1929. Serial No. 350,481.

This invention relates to a remote gear shift control for motor vehicles and the like, and is intended to provide a more convenient gear control arrangement for a vehicle by mounting an auxiliary gear control housing on the instrument board or steering column of the vehicle and connecting the same by means of flexible shafts through the transmission case cover either to the gear shifter forks or directly to the end of the gear shifting fork shafts thereby affording an arrangement whereby the present obstructive and inconvenient type of gear shifting lever mechanism may be eliminated, leaving the front floor board of the vehicle free of obstruction, thereby permitting easy access to the driver's seat from either side of the vehicle.

It is an object of this invention to provide a simplified remote gear shift control device which may be conveniently mounted in an out-of-the-way position to replace the ordinary type of gear shift lever control mechanism which is ordinarily mounted on the floor board in front of the driver's position.

It is also an object of this invention to provide a remote gear shift control for a vehicle transmission adapted to eliminate the use of the ordinary gear shift control lever, thereby affording a clear space in front of the driver's seat and at the same time affording a suitable control lever which may be conveniently positioned adjacent the steering column of the vehicle to facilitate controlling and driving of the vehicle.

It is an important object of this invention to provide a simplified and convenient remote gear control device adapted to be conveniently mounted on the instrument board or the steering column of a vehicle and having suitable flexible connections beneath the floor board directly to the transmission gear shifter forks or the transmission gear shifter fork shafts to control the operation of the transmission gears and eliminate the use of the ordinary gear shift lever mechanism, so that no obstructions whatever are placed upon the floor board in front of the driver's seat of the vehicle.

Other and further important objects of this invention will be apparent from the disclosures in the specification and the accompanying drawings.

This invention (in a preferred form) is illustrated in the drawings and hereinafter more fully described.

On the drawing:

Figure 1 is a fragmentary sectional vertical view through the front portion of a motor vehicle illustrating the improved remote gear shift control embodying the principles of this invention mounted on the instrument board and connected by flexible means to the transmission housing.

Figure 2 is a front view of the instrument board of the vehicle showing the position of the remote gear shift control lever.

Figure 3 is an enlarged fragmentary top plan view of the transmission casing and cover with parts of the cover broken away to illustrate the connections of the flexible shafts with the gear shift fork numbers.

Figure 4 is an enlarged fragmentary sectional view taken on line IV—IV of Figure 2 with parts shown in elevation.

Figure 5 is a fragmentary sectional view taken on line of V—V of Figure 4.

Figure 6 is a perspective view of the shifting lever fork guide plate removed from the shifting lever housing.

Figure 7 is an enlarged transverse sectional view of the shifting lever housing taken on line VII—VII of Figure 5.

Figure 8 is a fragmentary sectional view taken through the upper portion of the vehicle transmission housing and cover on line VIII—VIII of Figure 3.

As shown on the drawing:

The reference numeral 1 indicates a motor vehicle as a whole, having an instrument board 2, a dash board 3, the lower margin of which connects up with an inclined foot board 4 which slants downwardly and joins the front floor board 5 of the vehicle. Mounted in the usual place in the front section of the body of the vehicle is an inclined steering column 6 on the upper end of which a steering wheel 7 is rotatably supported. Positioned beneath the floor board 5 in the usual location is a transmission case or housing 8 provided with a closed cover 9. The standard transmission case cover and the gear shift or speed change lever are omitted and are replaced respectively by the closed cover 9 and by an improved remote gear shift control mechanism embodying the principles of this invention.

Mounted slidably within the transmission housing 8 are a pair of parallel gear shifter fork shafts 16 and 10, having secured thereto gear shifter forks 11 and 12 respectively. Integrally formed on the sleeve of the gear shifter fork 11 is an elbow arm 13, having pivotally connected to the outer hand thereof one end of a slidable actuating bar or arm 14 which is slidable in a guide sleeve 15 mounted longitudinally in the transmission cover 9. Connected to the outer end of the slidable actuating bar 14 is the lower end of a flexible shaft 17 which is mounted within a guide tube 18 which passes forwardly beneath the inclined foot board 4 and then upwardly behind the dash board 3 and has the upper end thereof projecting into and secured in a rear housing extension 19.

Integrally formed on the sleeve of the gear shifter fork 12 is a longer elbow arm 20 which extends over the transmission gear shifter shaft 16, and has pivotally connected to the outer end thereof an actuating bar 21 (Figure 3) which is slidable in a guide sleeve 22 mounted in the transmission cover 9 parallel to the guide sleeve 15. Connected to the outer end of the actuating slide bar 21 is the lower end of a flexible shaft 23 which is slidably mounted within a guide tube 24. The lower end of the guide tube 24 is connected to the other end of the guide sleeve 22 and then projects upwardly beneath the foot board 4 and behind the dash board 3, and has the upper end thereof projecting into and secured to the rear extension housing 19 beneath the upper end of the guide tube 18.

Mounted on the front face of the left hand of the instrument board 2 is a mounting plate 25 on the rear of which the auxiliary or extension housing 19 is secured or formed. The extension housing 19 as illustrated in Figure 1 projects through a suitable opening made in the instrument board 2. Secured to or formed on the mounting plate 25 is a shifting lever, housing 26, which is opened at both ends. One end of the housing 26 is closed by means of a removable closure plate 27 which is removably held in place by means of bolts or other suitable means. Rigidly secured on the inner space of the closure plate 27 are a pair of shifting lever guide plates 28 which are disposed in the same plane at right angles to the closure plate 27 and are spaced apart as clearly illustrated in Figure 6.

Secured on the opposite end of the housing 26 is a frustrum shaped hood or cover plate 29, the outer tapered end of which is provided with a socket 30 for the reception of a ball 31 forming a part of a gear shifting or speed control lever 32. The lever 32 projects through a dust cover or cap 33, which is engaged on the outer tapered end of the tapered hood or cover 29. Formed on the inner end of the shifting lever 32 is a flattened head or shifting disk 34, which, when the shifting lever 32 is in neutral position, is disposed in the neutral space provided between the two shifting lever guide plates 28 as illustrated in Figure 7. The shifting lever 32 projects out of the housing 26 in front of the instrument board 2 and has the outer end portion thereof bent or directed forwardly to project beneath the steering wheel 7 and to the right hand side of the steering column 6 as illustrated in Figures 1 and 2 to position the ball head or rounded handle 35 in a convenient position which is readily accessible by the right hand of a person driving the vehicle.

Connected on the upper end of the flexible shaft 17 is the shank portion 36 of a shifting block or fork 37. The shifting block or fork 37 is provided with a notch 38 (Figure 7) and furthermore is provided with a flat surface at 39 which is positioned to one side of the guide plates 28. The guide shift block or fork 37, when in neutral position, has the notch or recess 38 thereof positioned opposite the space between the guide plates 28 in a position to permit the shifting head or plate 34 of the gear shift control lever 32 to be moved into said recess or notch 38 to facilitate shifting of the fork 37 inwardly or away from the mounting plate 25 to obtain a reversing of the drive of the vehicle. To obtain first speed, the gear shift lever head 34 is moved into the notch 38 of the fork 37, and the delivered lever is then shifted away from the instrument board to cause the inner end of the lever to swing inwardly toward the mounting plate 25 so that the control shifter fork 37 is moved toward the mounting plate 25. Second speed is obtained by shifting the inner end of the control lever 32 so that the shifting head 34 is moved to neutral into the recess or notch 40 provided in a gear shift control fork or block 41 which is slidably mounted in the housing 26 and has the shank 42 thereof secured to the upper end of the second flexible shaft 23. One side of the shifting block or fork 41 is provided with a flat surface at 43 adjacent the guide plates 28. To obtain second or intermediate speed, the outer end of the control lever 32 is moved towards the instrument board 2 so that the control head 34 of the lever 32 which has been shifted to seat in the notch 40 is moved away from the mounting plate 25 so that the control block or shifting fork 41 is moved away from the mounting plate 25 to actuate the flexible shaft 23 and the elbow arm 20 to shift the transmission shifter shaft 10 to shift the speed control gears within the transmission housing to produce second or intermediate speed. By pulling the outer end of the control lever 32 toward the operator, the inner end or head 34 of the control lever which is still engaged in the notch 40 of the shifter fork 41, is actuated to cause the shifting fork 41 to slide toward the mounting plate 25 thereby again actuating the flexible shaft 23 and the control gears within the transmission to change the speed from second or intermediate into third or high.

The improved gear shift control device is of the remote control type and eliminates the use of the ordinary gear shift lever, which usually is mounted on the floor board in front of the front seat or driver's seat of a vehicle. By using the improved gear shift control device, the entire floor in front of the driver's seat is clear, thereby making it very convenient to enter and leave the car. The improved gear shift control or speed change lever is illustrated and described as being mounted upon the left hand side of the instrument board, but if desired, the gear shift lever device may be mounted upon the steering column or in any other suitable and convenient place where it can be easily operated by the driver of the vehicle. The housing in which the control lever is mounted is provided with the notched shafts or shifter forks which are separated by the guide plates 28 and are so positioned that the tail or inner end of the lever 32 extends between the shifter forks 37 and 41 so that the disk or head 34 on the inner end of the lever, is adapted to be moved into and out of co-acting relation with the notched shifter forks to permit operation of the flexible shafts 17 and 23 which extend into the transmission casing and are connected by means of the elbow arms 13 and 20 to the transmission shifter shafts 16 and 10 respectively to permit a standard selective operation of the transmission mechanism. The control lever 32 in the present case mounted on the instrument board is adapted to be operated in substantially the same manner that the ordinary standard gear shifter lever is adapted to be operated to obtain different speed changes for driving a vehicle.

It will, of course, be understood that many changes may be made and numerous details of construction may be varied through a wide range without departing from the principles of this invention, and it is, therefore, not purposed limiting the patent granted hereon, otherwise than necessitated by the scope of the appended claim.

I claim as my invention:

A gear shifting mechanism for an automobile having a dashboard and a transmission housing, comprising in combination with the gear shifting rods of the transmission, a housing arranged to be mounted extending through an aperture in the dashboard and having a flange for securement to the dashboard, a pair of rods, each having a notch in one end thereof, slidable in the said housing, a bent rod shifting lever mounted pivoted on the housing extending normally therefrom, the said lever having a flattened end portion for engagement in the notches in the rods, a plate on the housing, the said plate having a pair of spaced outstanding members positioned between the said rods in the housing, flexible cable means secured to the rods for movement therewith, cable guiding means on the housing of the transmission, the said flexible cables being arranged slidable in the said guiding means, curved members on the gear shifting rods, and links connecting the cables to the said curved members.

In testimony whereof I have hereunto subscribed my name at Chicago, Cook county, Illinois.

BERT GYLLIN.